May 3, 1938.  H. W. PARKER  2,116,080
VARIABLE COUPLER FOR ELECTRICAL SYSTEMS
Filed Sept. 3, 1936
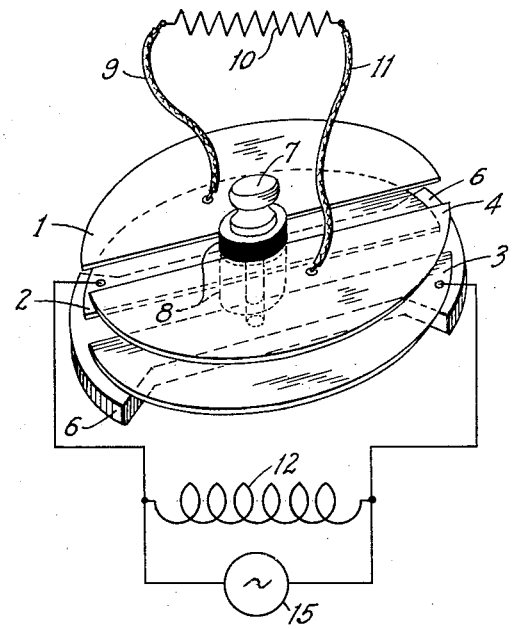
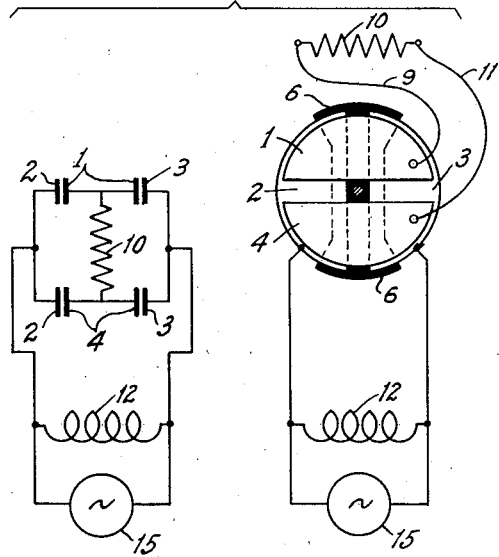
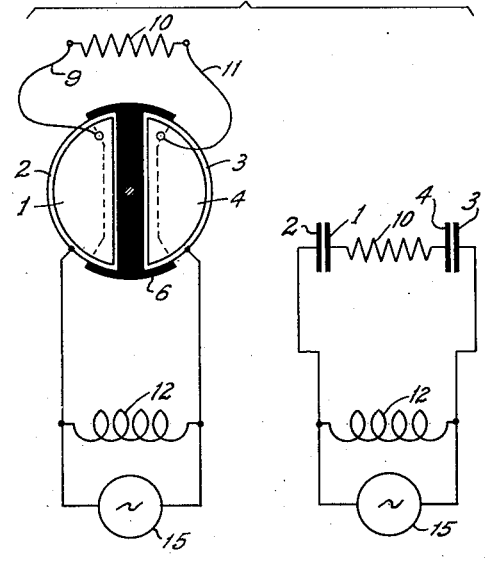
INVENTOR.
Henry W. Parker
BY Wm. J. Herdman
ATTORNEY.

Patented May 3, 1938

2,116,080

UNITED STATES PATENT OFFICE 2,116,080

VARIABLE COUPLER FOR ELECTRICAL SYSTEMS

Henry W. Parker, Toronto, Ontario, Canada, assignor to Rogers Radio Tubes Ltd., Toronto, Ontario, Canada, a corporation of Ontario, Canada Application September 3, 1936, Serial No. 99,221

2 Claims. (Cl. 178—44)

My invention relates to couplers or coupling systems for electrical systems and pertains in particular to variable couplers or coupling systems for controlling the transfer of energy from an alternating current source to a load.

Devices for variably coupling a load to a source of alternating current such as an electron discharge system, as, for example, a push-pull oscillator or amplifier, are at present unsatisfactory, especially when used to variably control the transfer of energy at ultra-high frequencies from such a source to a load because they possess one or more of the following disadvantages:

(1) Varying the coupler results in excessive changes in the frequency of the current transmitted therethrough;

(2) Varying the coupler loads up one side of the circuit more than the other, that is, destroys the symmetry or balance between the source and the load; and (3) They are incapable of varying from zero to a maximum value the energy transferred to the load, there being a minimum value which in the usual case amounts to about half the maximum full load.

One of the objects of my invention comprises producing a coupler for electrical systems which while simple in construction and operation effectively overcomes all of the above noted objections.

Another object comprises producing a coupler or system for coupling a push-pull electron discharge circuit to a load whereby the transfer of energy from such source to the load may be varied from zero to maximum value without disturbing the symmetry of the connection and with minimum frequency change.

I accomplish all of the above noted desirable features and results and others which will hereinafter be apparent by means of the novel structures, combination, inter-relation and arrangement of parts which will be hereinafter more specifically described with reference to the accompanying drawing forming a part of this specification and in which like reference numerals designate corresponding parts throughout.

In the drawing:

Fig. 1 is a perspective view of a form of capacitor for use in employing my invention with a load and source shown diagrammatically connected thereto;

Fig. 2 is a plan view of the same adjusted for zero energy transfer with the operating handle and insulating clamping bushings removed for clarity and a diagrammatic representation of the equivalent electrical circuit; and Fig. 3 is a plan view of the same adjusted for maximum energy transfer and a diagrammatic representation of the equivalent electrical circuit.

Referring now particularly to Fig. 1, the coupling reactance which I employ may conveniently comprise a plurality of condensers insulated from each other and may, in its simple form especially for use with ultra-high frequencies of the order of 50 megacycles, consist of four condenser plates 1, 2, 3 and 4. The plates 1 and 4 may be considered as the rotary plates and may be conveniently maintained in position with respect to each other and the stator plates 2 and 3 by means of insulating clamping washers 8 and a control handle and spindle 7. The stator plates 2 and 3 may be conveniently supported by means of a support 6 of insulating material. Methods of supporting such rotary plate condensers are well known in the art and I have chosen the simple construction shown for purposes of simplicity. The rotary plates 1 and 3 are connected by flexible conductors 9 and 11 respectively to a load 10. A source of alternating current 15, which may be an electron discharge or thermionic tube oscillator or amplifier connected in push-pull relation with an output impedance 12, is connected to stator plates 2 and 3 as shown.

It will be noted by reference to the diagrammatic representation of Fig. 2, that when the rotor plates 1 and 4 are turned to the position shown in Fig. 2, there is in effect connected between the source 15 and the load 10 a Wheatstone bridge having condensers 2—1 and 2—4 in a pair of the arms and condensers 1—3 and 4—3 in the remaining pair. It will be noted that the value of the capacitance of each of these condensers is in this adjustment of the rotary condenser equal. Therefore, no transfer of energy takes place between the source 15 or the output impedance 12 connected to a set of conjugate points of the bridge and the load 10 connected to the remaining set of conjugate points. As the rotary plates or condensers are turned either to the right or left as viewed in Figs. 2 and 3, the capacitance of each of a pair of the condensers is simultaneously increased by equal amounts while the capacitance of each of the remaining pair is at the same time reduced by substantially the same equal amounts respectively to cause an unbalance of the bridge and permit energy to be transferred from the source to the load. When the rotary plates of the condenser have been turned to approximately 90° their relation with the stator plates is as is shown in Fig. 3 and by reference to the diagrammatic representation of the equivalent circuit of Fig. 3 the load is connected to the source simply through condensers 2—1 and 4—3 which now have approximately double the capacitance of any of the condensers shown in Fig. 2 and the bridge is unbalanced to a maximum extent to permit maximum transfer of energy from the source 15 or output impedance 12 to the load 10.

I have discovered and experimentally verified in models of my invention that I have constructed and demonstrated, that the transfer of energy from a push-pull oscillator or amplifier may be easily and simply varied from a zero value to a maximum value without disturbing the symmetry of the connection between the source and the load and with minimum frequency change. The total capacity reactance connected to the source is substantially constant for any adjustment of the coupler and in loads of pure resistance as the reactance is constant the frequency remains constant for any adjustment of the coupler.

It will be apparent from the foregoing that my improved coupler provides a simple and effective means for varying the transfer of energy between an alternating current source and a load from zero value to a maximum value and where such source is an electron discharge amplifier or oscillator connected in push-pull relation that the symmetry of the connection is at all times maintained and that the frequency change is not excessive. Where the load 10 is a pure resistance load, it will be further noted that my improved coupler provides means for varying the transfer of energy between the source and the load from zero to maximum value while maintaining the reactance of the coupler as viewed from the source at constant value resulting in substantially no frequency change.

I have shown my device as especially adapted for use with ultra-high frequency currents. Where it is desired to utilize the device with currents of lower frequencies the stators and rotors of the condensers may be multi-interleaved plates as is well known in the art, or each of the four condensers, as shown in diagram in Fig. 2, may consist of separate multi-plate variable condensers mounted on a single shaft and with the rotors so positioned with respect to each other and with respect to the stators in pairs as to accomplish the results hereinbefore described as will be readily apparent to those skilled in the art.

If desired, also, a pair of the condensers as 2—1, 4—3, Fig. 2, may be fixed condensers each of equal value and of value equal to the maximum value of condensers 1—3 and 2—4. These latter two condensers may be variable condensers and their capacities may be simultaneously varied from zero to maximum value to accomplish the control of transfer of energy from the source to the load. This arrangement, however, is not from the standpoint of cost as desirable as the arrangement hereinbefore described but is of advantage in frequencies of the order of one megacycle. In this arrangement of course the total capacity reactance is not maintained constant, so that even with loads of pure resistance the frequency varies as the coupler is varied.

While I have shown and described by way of example only, one embodiment of my invention, it will be apparent that various changes may be made therein without departing from the intended scope and spirit of the invention. I do not therefore desire to limit myself to the foregoing except as may be pointed out in the appended claims in which I claim:

1. A variable coupler comprising, a first set of plane surface condenser plates of similar area and contour, insulating means for mounting said plates in fixed relation to each other with their plane surfaces coplanar, a second set of plane surface condenser plates having similar area and contour to each other and to said first set, insulating mounting means for said second set of plates for maintaining said plates in fixed relation to each other with their plane surfaces coplanar and in a plane parallel to the plane of the surfaces of said first set of plates, a source of alternating current connected between said first set of plates, a load connected between said second set of plates, and means for moving as a unit one of said set of plates with respect to the other whereby the transfer of energy from said source to said load may be varied without disturbing the symmetry of the connection and with minimum frequency change from a zero value for one extreme position of said plates which produces by the relation of said first set of plates with said second set of plates a balanced Wheatstone bridge between said source and said load, to a maximum value for the other extreme position of said plates which produces by the relation of said sets of plates a maximum unbalance between said source and said load.

2. A variable coupler comprising, a first set of plane surface condenser plates of similar area and contour, insulating means for mounting said plates in fixed relation to each other with their plane surfaces coplanar, a second set of plane surface condenser plates having similar area and contour to each other and to said first set, insulating means for said second set of plates for maintaining said plates in fixed relation to each other with their plane surfaces coplanar and in a plane parallel to the plane of the surfaces of said first set of plates, a source of alternating current connected between said first set of plates, a load connected between said second set of plates, and means for moving as a unit one of said set of plates from one extreme position in which the contours and areas of the individual plates of one set coincide respectively with the contours and areas of the individual plates of the other set to produce a maximum unbalance between said source and said load to permit maximum current flow therebetween, to the other extreme position in which each plate of one set overlaps by equal areas the plates of the other set of plates to produce zero current flow between said source and said load whereby the transfer of energy from said source to said load may be varied from maximum value to zero without disturbing the symmetry of the connection and with minimum frequency change.

HENRY W. PARKER.